Aug. 30, 1966  E. T. CARR  3,269,206
VEHICLE
Filed Sept. 3, 1963  3 Sheets-Sheet 2

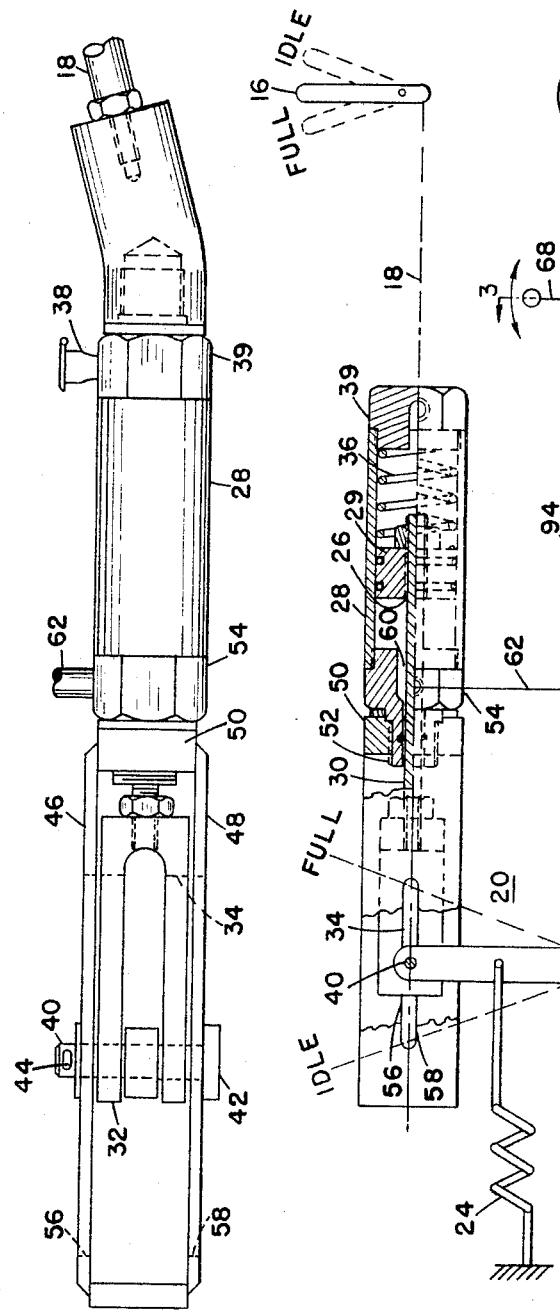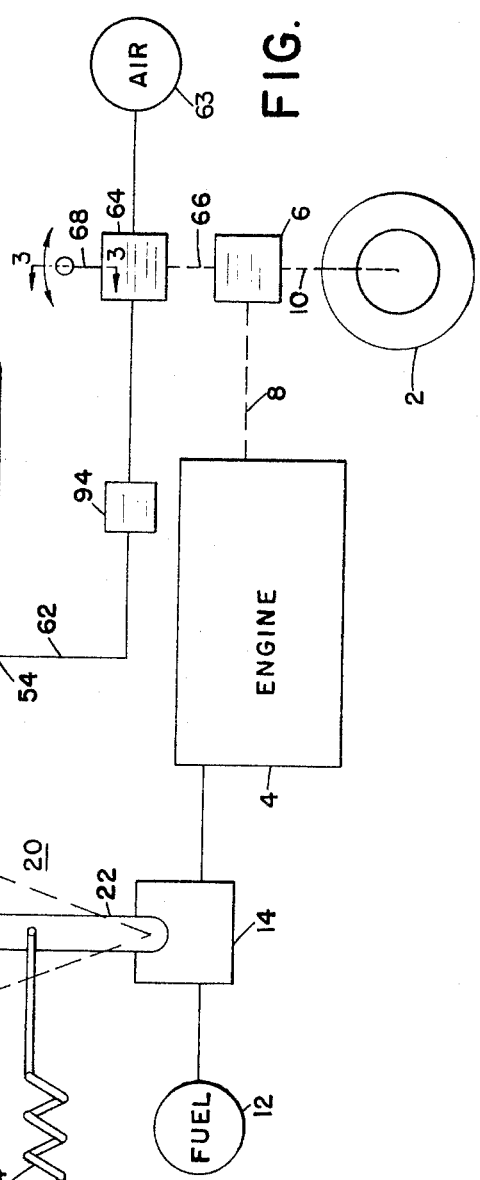

INVENTOR:
EARL T. CARR
BY
JOHN F. SCHMIDT
HIS ATTORNEY

Aug. 30, 1966  E. T. CARR  3,269,206
VEHICLE

Filed Sept. 3, 1963  3 Sheets-Sheet 3

INVENTOR:
EARL T. CARR
BY
JOHN F. SCHMIDT
HIS ATTORNEY

United States Patent Office 3,269,206
Patented August 30, 1966

3,269,206
VEHICLE
Earl T. Carr, Secor, Ill., assignor to LeTourneau-Westinghouse Company, Peoria, Ill., a corporation of Illinois
Filed Sept. 3, 1963, Ser. No. 305,933
13 Claims. (Cl. 74—472)

This invention relates to a vehicle, especially to an automotive vehicle of widely variable speeds, in which an engine drives propelling means, such as a wheel, through a variable ratio device, usually called a transmission, under conditions which often result in shift shock when the transmission is shifted from gear to gear.

In earthmoving equipment, heavily loaded tractors are equipped with high horsepower engines operating at widely varying speeds requiring frequent shifting. In conventional equipment, shifting of the transmission under heavy load and at high engine speeds produces shift shocks that bring about early failure of the power train, especially clutches. Because the operator is busy so much of the time watching a dozer blade, or a scraper bowl or blade, and the like, and has to control blade depth etc., it is not feasible to require the operator to cut engine speed to idle every time he shifts gears. If such engine speed control is to be accomplished, it is virtually necessary that it be done automatically—i.e., without conscious effort toward that end by the operator.

It is accordingly an object of the invention to provide an automotive vehicle with engine control means responsive to transmission shifting such that no conscious effort at engine speed control during shifting need be made by the operator, who need only think about shifting gears and controlling the work functions of his machine.

In the drawings:

FIG. 1 is a largely schematic view of a vehicle made according to this invention, with parts broken away and in section to show details.

FIG. 2 is a view of certain structure of FIG. 1, on a larger scale.

Figure 3:
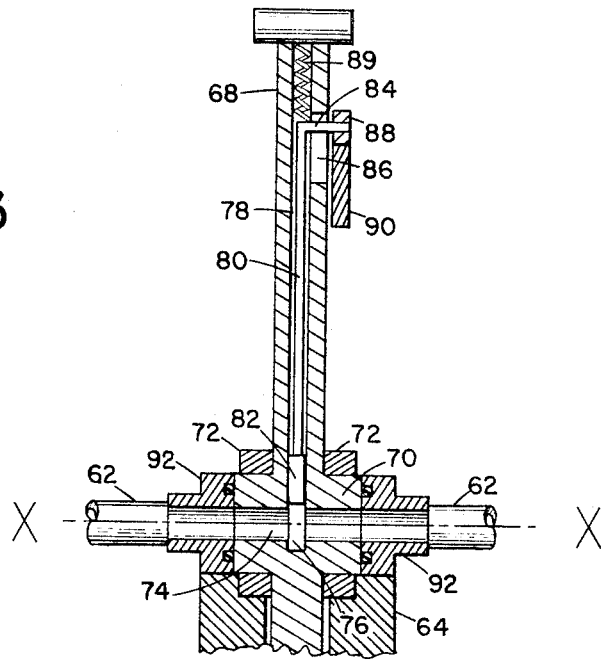
FIG. 3 is a view in section on line 3—3 of FIG. 1, but on a larger scale.
Figure 4:
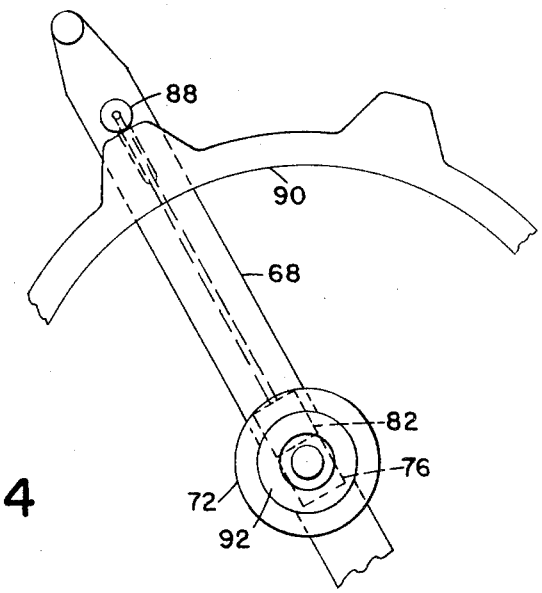
FIG. 4 is a view of the detail shown in FIG. 3 but taken from the right side of FIG. 3 and looking toward the left.

Referring now to FIGS. 1 through 4 for a description of one embodiment of the invention, a portion of a vehicle is shown schematically as having means to propel the vehicle, such as a ground engaging drive wheel 2. A suitable power plant 4 is shown connected to drive the propelling means by a power train which includes a variable ratio device 6 and other elements illustrated schematically by dotted lines 8 and 10. It will be understood that dotted lines 8 and 10 comprise such conventional elements as clutch means, shafts, differential means, flexible couplings where needed, reduction gears, and the like. Those skilled in the art will also understand that variable ratio device 6 may be any one of a number of commercially available transmissions having an output that is positively driven by an input through two or more selectable drives having definite gear ratios, which may be gear reductions or overdrives or a combination of them.

Power plant or engine 4 is supplied with fuel by means including a tank 12 and a suitable throttle 14. Operator-operable means 16 is provided to control throttle 14 through linkage including a flexible cable 18 and fluid pressure operated means 20. Means 20 includes resilient means connected to bias throttle 14 toward one extreme position and a piston-and-cylinder device connected to move the throttle against such bias. Thus, a control member or throttle lever 22 is connected to operate throttle 14, and is biased toward the "IDLE" position by a spring 24. The piston-and-cylinder device has two relatively movable parts, namely a piston part 26 and a cylinder part 28.

One of the parts is connected with throttle 14 and the other part is connected with operator-operable means 16. More specifically, piston part 26 includes a piston 29 and a rod 30; rod 30 is connected at its left end by threaded means to a lost-motion device comprising a yoke 32 provided with a slot 34, and cylinder part 28 is connected with means 16 by the flexible cable 18. A spring 36 biases piston 29 toward the left. Movement of the piston is facilitated by lubrication provided by an oil cup 38 mounted in cylinder head 39.

Connection of yoke 32 with throttle lever 22 is by a pin 40 having a head 42 at one end and drilled at its other end to receive a cotter pin 44.

Desirably, pin 40 is supported by arms 46 and 48 secured to a nut 50 screwed onto a threaded boss 52 formed integral with cylinder head 54, the arms being slotted as shown at 56 and 58. The support thus provided for pin 40 relieves the piston-and-cylinder device of lateral strains which would otherwise be imposed and which might result in bending rod 30, or in other damage.

Cylinder head 54 is of course centrally bored to permit movement therethrough of rod 30 and is suitably packed against fluid leakage. Head 54 is counterbored as at 60 to provide a fluid passage connecting with a transverse bore and a conduit 62. Conduit 62 forms fluid conduit means connecting a source of fluid under pressure, such as a compressed air tank 63, with the fluid pressure operated means. The fluid conduit means includes a valve operated in response to variation of the power train drive ratio, and also includes means quickly to vent to atmosphere upon closure of the valve.

In the embodiment shown, a selector 64 is shown as connected to operate variable ratio device 6, the connection being shown schematically at 66. Selector 64 and connection 66 are of course adapted to whatever type of variable ratio device 6 is in use in, or is designed for, a given piece of equipment. Variable ratio device 6 may be any one of a large number of commercially available transmissions and gear boxes, in which the shifting, or change from one ratio to another, may be accomplished pneumatically, hydraulically, electrically, or by a direct mechanical connection, automatically or at the will of the operator. The details of variable ratio device 6 and the method by which ratio changes are made form no part of this invention. The only requirement from the standpoint of this invention is that the throttle linkage respond to ratio changes, however made, to reduce engine speed, and preferably to move the engine control, or throttle, from any "load" position to the position for "IDLE" operation of the engine.

To this end, selector 64 in the embodiment shown is provided with a handle 68 having a hub 70 oscillatably mounted by means of bearings 72. Hub 70 is centrally bored as at 74 and slotted as at 76, bore 74 and slot 76 intersecting each other. A recess 78 in handle 68 receives an actuating rod 80 which carries at its lower end a valve closure 82 movable in slot 76. The upper end of rod 80 is bent as at 84 to protrude through a slot 86 in handle 68, and carries a cam follower 88. A spring 89 in the upper end of recess 78 biases cam follower 88 against a cam 90 positioned to engage the cam follower as handle 68 swings arcuately about its pivot axis X—X. Stationary connections 92 have suitably packed faces in engagement with end faces on hub 70 and connect the bore 74 with the rest of conduit 62.

In many applications, means quickly to vent conduit 62, upon closure of bore 74, are desirable, and quick release means 94 can be provided where deemed necessary. Such quick release valves are commercially available, and may be of the type shown in U.S. Patent 2,040,580, issued May 12, 1936, to Stephen Vorech.

Figure 5:
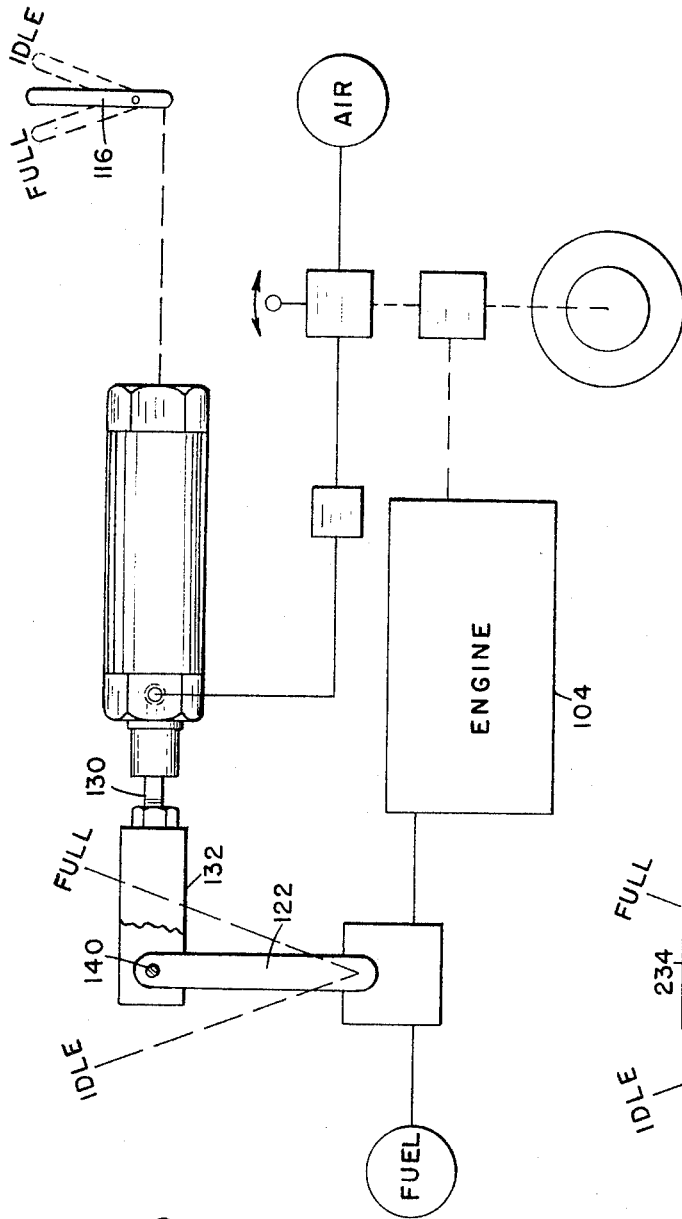
FIG. 5 is a view similar to FIG. 1, but showing another embodiment of the invention.

FIG. 5 shows another embodiment of the invention, in which yoke 132 is not slotted as in FIGS. 1 and 2, but is simply drilled to receive pin 140. In this embodiment, yoke 132 is connected to move arm 122 both ways, so that the spring 24 of FIG. 1 is not needed. Since the embodiment shown in FIG. 5 lacks the support means provided by slotted arms 46 and 48 of FIGS. 1 and 2, the stem 130 and associated elements will have to be designed to withstand the added loads.

Figure 6:
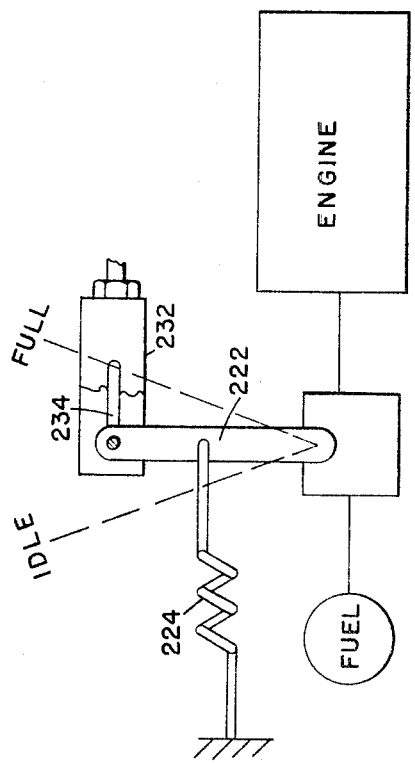
FIG. 6 is a partial view of a system showing still another embodiment.

Still another embodiment is shown in FIG. 6, this embodiment being a modification of the one shown in FIG. 5. In the embodiment of FIG. 6, the yoke 232 is slotted as shown at 234 to provide a lost-motion connection with arm 222. Spring 224 biases arm 222 and the connected throttle element toward the IDLE throttle position.

*Operation*

Reference will be made now to FIGS. 1-4 for a discussion of the operation of the invention in the embodiment there shown. Let is be assumed that the vehicle is in motion and that the engine is loaded. Let it further be assumed that the operator desires to change the drive ratio of the variable ratio device 6. To accomplish the change in the drive ratio (shift gears), the operator moves handle 68 in the direction required to accomplish the change desired. As the operator moves handle 68, cam follower 88 drops off the cam lobe it is resting on and spring 89 moves valve closure 82 into the lower portion of slot 76, thus blocking bore 74. As soon as bore 74 is effectively blocked, quick release means 94 in conduit 62 vents the conduit to atmosphere and quickly reduces the pressure in conduit 62 to atmospheric pressure.

Thereupon spring 36 in the cylinder 28 pushes piston 29 to the left as seen in FIG. 1, moving the lost-motion device including yoke 32 to the left. Spring 24 then pulls throttle control arm 22 toward the left as seen in FIG. 1 and into the IDLE position.

Even though the inertia of the engine precludes very much of a drop in r.p.m., the fact that the throttle has been repositioned to its IDLE position means that there is very little fuel going to the engine so that the engine is not delivering any appreciable power to the variable ratio device. This fact means a very substantial reduction in the shock imposed on the power train, with the result that the shifting of gears or, more broadly, the ratio change, in variable ratio device 6 takes place under a minimum of load in the power train.

As the handle is moved to its next "speed" position, cam follower 88 rides up on the next lobe of cam 90, lifting valve closure 82 out of the lower portion of slot 76 (FIG. 3), with the result that bore 74 is again open to the pressure of air in tank 63. This pressure is applied to the left face of piston 29 through the fluid conduit 62, counterbore 60, and that portion of the internal volume of cylinder 28 to the left of piston 29. The pressure thereupon moves piston 29 to the right as seen in FIG. 1, recompressing spring 36 and restoring the piston and cylinder to their relative positions occupied before the shifting operation was started. This restores throttle control arm 22 to the position it occupied before the operator moved handle 68.

It will be noted that the movement of throttle control arm 22 to the left, or counterclockwise as seen in FIG. 1, under the influence of spring 24, is independent of the position of operator-operable means 16. In other words, no matter where the operator has the throttle handle 16 set, movement by the operator of arm 68 to change the ratio of variable ratio device 6 will return throttle control arm 22 to the IDLE position without any conscious effort on the part of the operator to reduce engine speed.

The operation of the embodiment shown in FIG. 5 is generally similar to the operation of the embodiment shown in FIGS. 1-4, except that the lost-motion connection is not present in FIG. 5. This means that the movement of throttle control arm 122 during shifting is dependent upon the position of the throttle handle, or operator-operable means 116, and the stroke of the piston. The result will be a reduction in the rate of fuel flow to engine 104, but the throttle may not always be returned all the way to its IDLE position.

The operation of the embodiment shown in FIG. 6 will be understood by those skilled in the art from the foregoing discussion of the operation of the embodiments shown in FIGS. 1-4 and in FIG. 5.

While there are in this application specifically described three forms which the invention may assume in practice, it will be understood that these forms of the same are shown for the purpose of illustration, and that the invention may be modified and embodied in various other forms without departing from the spirit and scope of the invention as set forth in the appended claims.

What is claimed is:
1. In a vehicle,
an engine,
means including a throttle to supply fuel to the engine, the throttle having an idle position and a plurality of load positions,
means to propel the vehicle,
means connecting the engine and the propelling means and including a variable ratio device,
a source of fluid under pressure,
a fluid pressure operated selector connected with said source to control said device,
operator-operable means, and
linkage connecting the operator-operable means and the throttle and including fluid pressure operated means connected to receive fluid under pressure for throttle control by the operator-operable means while the ratio of said device is fixed and adapted to discharge fluid to move the throttle toward idle position in response to selector operation to vary the ratio of said device.

2. In a vehicle,
an engine,
means including a throttle to supply fuel to the engine, the throttle having an idle position and a plurality of load positions,
means to propel the vehicle,
means connecting the engine and the propelling means and including a variable ratio device,
a selector operable and connected to control said device,
operator-operable means,
a source of fluid under pressure, and
linkage connecting operator-operable means and the throttle and including fluid pressure operated means connected to receive fluid under pressure from said source for throttle control by the operator-operable means while the ratio of said device is fixed and adapted to discharge fluid to move the throttle toward idle position in response to selector operation to vary the ratio of said device.

3. In a vehicle,
an engine,
means including a throttle to supply fuel to the engine, the throttle having an idle position and a plurality of load positions,
means to propel the vehicle, means connecting the engine and the propelling means and including a variable ratio device,
a selector operable and connected to control said device,
operator-operable means,
a source of fluid under pressure, and
linkage connecting the operator-operable means and the throttle and including means having a fully expanded condition and a fully contracted condition and connected with said source to be fully contracted for throttle control by the operator-operable means while the ratio of said device is fixed and adapted to be fully expanded to move the throttle toward idle position in response to selector operation to vary the ratio of said device.

4. In a vehicle,
an engine,
means including a throttle to supply fuel to the engine, the throttle having an idle position and a plurality of load positions,
means to propel the vehicle,
means connecting the engine and the propelling means and including a variable ratio device,
a selector operable and connected to control said device,
operator-operable means,
a source of fluid under pressure, and
linkage connecting the operator-operable means and the throttle and including fluid pressure operated means operable to move the throttle toward idle position in response to selector operation to vary the ratio of said device.

5. The invention as in claim 4, wherein the fluid pressure operated means includes resilient means connected to bias the throttle into one position and an expansible chamber device connected to oppose the resilient means.

6. The invention as in claim 4, in which the linkage includes means whereby throttle movement to the idle position by the fluid pressure operated means is independent of the position of the operator-operable means.

7. The invention as in claim 4, in which the linkage includes lost-motion means whereby throttle movement to the idle position by the fluid pressure operated means is independent of the position of the operator-operable means.

8. In a vehicle,
(A) an engine,
(B) means including a throttle to supply fuel to the engine, the throttle having an idle position and a plurality of load positions,
(C) means to propel the vehicle,
(D) means connecting the engine and the propelling means and including a variable ratio device,
(E) a selector operable and connected to control said device,
(F) operator-operable means,
(G) a source of fluid under pressure,
(H) linkage connecting the operator-operable means and the throttle and including fluid pressure operated means having two relatively movable parts,
 (a) one of which is connected with the throttle and
 (b) the other of which is connected with the operator-operable means,
(I) and fluid conduit means connecting the source with the fluid pressure operated means and including a valve connected to be operated in response to operation of the selector.

9. In a vehicle,
(A) an engine,
(B) means including a throttle to supply fuel to the engine, the throttle having an idle position and a plurality of load positions,
(C) means to propel the vehicle,
(D) means connecting the engine and the propelling means and including a variable ratio device,
(E) a selector operable and connected to control said device,
(F) operator-operable means,
(G) a source of fluid under pressure,
(H) linkage connecting the operator-operable means and the throttle and including fluid pressure operated means having two relatively movable parts,
 (a) one of which is connected with the throttle and
 (b) the other of which is connected with the operator-operable means,
(I) and fluid condut means connecting the source with the fiuid pressure operated means and including
 (a) a valve connected to be operated in response to operation of the selector, and
 (b) means to vent the fluid pressure operated means quickly upon operation of the valve to close the fluid conduit means.

10. In a vehicle,
means to propel the vehicle,
an engine,
a power train to connect the engine with the propelling means and including a variable ratio device,
a selector to vary the ratio of said device,
means to supply fuel to the engine and including a throttle having an idle position and a full position,
a control member connected to the throttle,
lost-motion means having a lost-motion connection with the control member,
resilient means biasing the control member in one direction,
a fluid pressure operated expansible chamber device having two relatively movable parts of which one is connected to move the lost-motion means,
operator-operable means connected to the other one of the two relatively movable parts of the expansible chamber device,
a source of fluid under pressure, and
conduit means connecting the source with the expansible chamber device and including a valve connected to close in response to operation of the selector.

11. A vehicle as in claim 10, and support means secured to said other one of the two relatively movable parts of the expansible chamber device and guiding the movement of said connection.

12. A vehicle as in claim 11, and means quickly to vent the conduit means upon closure of the valve.

13. A vehicle as in claim 10, and means quickly to vent the conduit means upon closure of the valve.

References Cited by the Examiner
UNITED STATES PATENTS

| | | | |
|---|---|---|---|
| 2,229,055 | 1/1941 | Dick | 192—.084 |
| 2,434,489 | 1/1948 | Dugas | 192—.084 |

FRANK SUSKO, *Primary Examiner.*

DAVID J. WILLIAMOWSKY, *Examiner.*

H. S. LAYTON, *Assistant Examiner.*